(12) United States Patent
Lee

(10) Patent No.: US 10,508,719 B2
(45) Date of Patent: Dec. 17, 2019

(54) AUTO TENSIONER AND AUTO TENSIONER-INTEGRATED ENGINE AUXILIARY DEVICE

(71) Applicant: HYUNDAI MOTOR COMPANY, Seoul (KR)

(72) Inventor: Byung Hyun Lee, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 450 days.

(21) Appl. No.: 15/373,149

(22) Filed: Dec. 8, 2016

(65) Prior Publication Data
US 2018/0031086 A1 Feb. 1, 2018

(30) Foreign Application Priority Data

Jul. 26, 2016 (KR) .................. 10-2016-0094482

(51) Int. Cl.
F16H 7/16 (2006.01)
F16H 7/14 (2006.01)
F16H 39/00 (2006.01)
F01P 5/12 (2006.01)
F02B 67/06 (2006.01)
F16H 55/36 (2006.01)
F16H 7/08 (2006.01)

(52) U.S. Cl.
CPC ................. F16H 7/16 (2013.01); F01P 5/12 (2013.01); F02B 67/06 (2013.01); F16H 7/14 (2013.01); F16H 39/00 (2013.01); F16H 55/36 (2013.01); F16H 2007/0806 (2013.01); F16H 2007/0808 (2013.01); F16H 2007/0812 (2013.01); F16H 2007/0865 (2013.01); F16H 2007/0893 (2013.01)

(58) Field of Classification Search
CPC ............ F16H 7/16; F16H 55/36; F02B 67/06
See application file for complete search history.

(56) References Cited

U.S. PATENT DOCUMENTS

| 4,530,682 | A | * | 7/1985 | Gruber | .................. F16H 7/0827 474/133 |
| 4,563,167 | A | * | 1/1986 | Foster | ................... F16H 7/1236 474/115 |
| 5,273,494 | A | * | 12/1993 | Varin | .................... F16H 7/0848 474/110 |
| 5,918,717 | A | * | 7/1999 | Fohl | .................... B60R 22/4628 192/103 A |

(Continued)

FOREIGN PATENT DOCUMENTS

DE 19632167 A1 2/1998
DE 102008011136 A1 8/2009
(Continued)

Primary Examiner — Michael R Mansen
Assistant Examiner — Mark K Buse
(74) Attorney, Agent, or Firm — Morgan, Lewis & Bockius LLP

(57) ABSTRACT

An auto tensioner is mounted on a rotating shaft of an engine auxiliary device rotating about the rotating shaft by a power transmitted through a power transmission belt. The auto tensioner pivots about a pivot shaft. The auto tensioner has one side rotatably fastened to the pivot shaft and another side fastened to a driving member, and pivots about the pivot shaft in accordance with an operation of the driving member.

18 Claims, 8 Drawing Sheets

(56) References Cited

U.S. PATENT DOCUMENTS

| | | | |
|---|---|---|---|
| 6,158,326 A | 12/2000 | Burgdorf et al. | |
| 8,057,334 B2* | 11/2011 | Kotzur | F16H 7/1281 474/133 |
| 8,162,786 B2 | 4/2012 | Lang et al. | |
| 8,568,259 B2* | 10/2013 | Robbins | F16H 7/1281 474/135 |
| 8,602,930 B2* | 12/2013 | Deneszczuk | F16H 7/1281 474/112 |
| 9,453,561 B2* | 9/2016 | Zacker | F16H 7/1218 |
| 10,018,254 B2* | 7/2018 | Wright | F02B 63/04 |
| 2006/0287146 A1* | 12/2006 | McVicar | F16H 7/1281 474/109 |
| 2011/0070984 A1* | 3/2011 | Kotzur | F16H 7/1281 474/133 |
| 2011/0135444 A1 | 6/2011 | Lee | |
| 2017/0343083 A1* | 11/2017 | Wright | F02B 63/04 |
| 2018/0163788 A1* | 6/2018 | Dell | F02B 67/06 |

FOREIGN PATENT DOCUMENTS

| | | |
|---|---|---|
| JP | 2006-077941 A | 3/2006 |
| JP | 2013-170673 A | 9/2013 |
| KR | 2005-0002860 A | 1/2005 |
| KR | 10-2005-0026114 A | 3/2005 |
| KR | 10-2005-0062052 A | 6/2005 |
| KR | 10-2013-0046260 A | 5/2013 |
| WO | 2006/037433 A1 | 4/2006 |
| WO | 2016/061685 A1 | 4/2016 |

* cited by examiner

AUTO TENSIONER AND AUTO TENSIONER-INTEGRATED ENGINE AUXILIARY DEVICE

CROSS-REFERENCE TO RELATED APPLICATION

This application claims under 35 U.S.C. § 119(a) the benefit of priority to Korean Patent Application No. 10-2016-0094482 filed on Jul. 26, 2016, the entire content of which is incorporated herein by reference.

TECHNICAL FIELD

The present disclosure relates to an auto tensioner and an auto tensioner-integrated engine auxiliary device. More particularly, the present disclosure relates to an auto tensioner and an auto tensioner-integrated engine auxiliary device, which are capable of normally performing both a function of the engine auxiliary device and a function of adjusting tension of a power transmission belt.

SUMMARY

In general, driving power generated by an engine of an automobile is used as a power source for driving engine auxiliary devices as well as for rotating vehicle wheels to allow the automobile to travel, and as the auxiliary devices that use driving power from the engine as a power source as described above, there are, for example, a generator, a water pump, and an air-conditioner compressor.

The auxiliary devices are typically configured to operate by receiving the driving power from the engine by a belt (power transmission belt), and to this end, a driven pulley is provided which operates in conjunction with a crank shaft pulley of the engine by the belt.

The auxiliary devices, which are connected to one another by the belt and receive the driving power from the engine, are equipped with an auto tensioner as a tension adjusting device for adjusting tension of the belt in order to prevent deterioration in power transmission efficiency, and the auto tensioner is typically mounted in a movement trajectory of the belt and imparts predetermined tension to a belt surface.

However, in the related art, because of a structure of a cooling system including a water pump for circulating a coolant for cooling the engine, the water pump is positioned at the middle of various engine auxiliary devices connected to one another by the belt, and as a result, there is a problem in that it is difficult to implement compact layouts of the auto tensioner and the belt.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with the prior art, and to provide an auto tensioner and an auto tensioner-integrated engine auxiliary device, which are capable of normally performing both a function of the engine auxiliary device and a function of adjusting tension of a power transmission belt.

In particular, the present disclosure has been made in an effort to provide an auto tensioner-integrated engine auxiliary device in which a driving member is connected to a driven pulley of an engine auxiliary device (e.g., a water pump pulley) which is rotated by an operation of a belt such that belt tension may be adjusted by an eccentric movement of the driven pulley, and rotational power of the driven pulley may be normally and effectively transmitted to an output unit of the engine auxiliary device (e.g., a water pump impeller).

According to an exemplary embodiment of the present disclosure, an auto tensioner which is mounted on a rotating shaft of an engine auxiliary device rotating about the rotating shaft by a power transmitted through a power transmission belt, and pivots about a pivot shaft.

The auto tensioner may have one side rotatably fastened to the pivot shaft and another side fastened to a driving member, and may pivot about the pivot shaft in accordance with an operation of the driving member.

The driving member may include a cylinder portion that is operated by hydraulic pressure, and an elastic member, which provides a restoring force when the hydraulic pressure is eliminated, may be disposed on an outer circumferential surface of the cylinder portion.

The auto tensioner may further include: a driving plate which is coupled to the rotating shaft and receives power; and a driven plate which rotates by receiving rotational force of the driving plate, in which a plurality of vanes, which transmit the rotational force of the driving plate to the driven plate, are disposed on the driven plate.

Each of the vanes may include a head portion which is fixed to an edge portion of the driven plate, and a body portion which extends from the head portion toward a center of the driven plate, and the driving plate may have a driving block which has moving grooves in which the body portions are accommodated.

A core portion may be inserted into the vane, and the body portion may be formed by injection molding so that a thickness thereof is increased in a direction toward a center of the driven plate.

According to another embodiment of the present disclosure, an auto tensioner-integrated engine auxiliary device including: a pulley unit which is rotated by power transmitted through a power transmission belt; a rotating shaft which is coupled to a center of the pulley unit and rotates simultaneously with the pulley unit; an output unit which rotates by receiving power of the rotating shaft; and an auto tensioner which operates such that the rotating shaft pivots about a pivot shaft.

The auto tensioner may be mounted on the rotating shaft by a bearing (a first bearing) that is rotatable relative to the rotating shaft, and the auto tensioner may have one side rotatably fastened to the pivot shaft and another side fastened to a driving member, and may pivot about the pivot shaft in accordance with an operation of the driving member.

The driving member may include a cylinder portion that is operated by hydraulic pressure, and an elastic member, which provides restoring force when the hydraulic pressure is eliminated, may be disposed on an outer circumferential surface of the cylinder portion.

The auto tensioner-integrated engine auxiliary device may further include: a driving plate which is coupled to the rotating shaft and receives power; and a driven plate which rotates by receiving rotational force of the driving plate, in which a plurality of vanes, which transmit the rotational force of the driving plate to the driven plate even when the rotating shaft pivots, are disposed on the driven plate.

Each of the vanes may include a head portion which is fixed to an edge portion of the driven plate, and a body portion which extends from the head portion toward a center of the driven plate, and the driving plate may have a driving block which has moving grooves in which the body portions are accommodated.

A core portion may be inserted into the vane, and the body portion may be formed by injection molding so that a thickness thereof is increased in a direction toward a center of the driven plate.

The pulley unit may be a water pump pulley disposed in a water pump among the engine auxiliary devices, and the output unit may be a water pump impeller disposed in the water pump.

According to another embodiment of the present disclosure, an auto tensioner-integrated engine auxiliary device including: a water pump pulley which adjusts tension of a power transmission belt by pivoting about a pivot shaft and simultaneously rotates about a rotating shaft by power transmitted through the power transmission belt; and a power transmission unit which transmits rotational power of the water pump pulley, which rotates about the rotating shaft, to a water pump impeller.

The water pump pulley may be coupled to an inner circumferential surface of a support bracket so as to be rotatable simultaneously with the rotating shaft, and the support bracket may have a driving member coupling hinge portion coupled to a driving member, and an engine coupling hinge portion mounted on an engine so as to be rotatable about a pivot shaft.

The power transmission unit may include: a driving plate which is coupled to the water pump pulley so as to be rotatable and pivotable integrally with the water pump pulley; a driven plate which is coupled to the water pump impeller so as to be rotatable simultaneously with the water pump impeller and rotates by receiving rotational force of the driving plate; and a plurality of vanes which are assembled between the driving plate and the driven plate and transmit the rotational force of the driving plate to the driven plate even when the water pump pulley pivots.

The vane may include a head portion which is fixed to the driven plate, and a body portion which is assembled to be linearly movable in a moving groove disposed in the driving plate, and the vane may have a neck portion which is connected between the head portion and the body portion and may have a narrowed shape, such that when the driving plate pivots about the pivot shaft, the body portion is resiliently bendable relative to the head portion.

A driving block, which has a plurality of moving grooves, may be disposed on the driving plate, and the moving grooves may extend in a radial direction from an outer circumferential surface of the driving block.

According to the present disclosure, since the water pump pulley performs a function of a tensioner pulley which was used to adjust tension of the existing power transmission belt, it is possible to omit the existing tensioner pulley, reduce a size of a package, increase a mounting space, reduce a length of the power transmission belt, reduce costs and a weight, and improve fuel economy. In addition, it is possible to implement a compact and simple layout of the power transmission belt to which the engine auxiliary device and the auto tensioner are applied.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuel derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
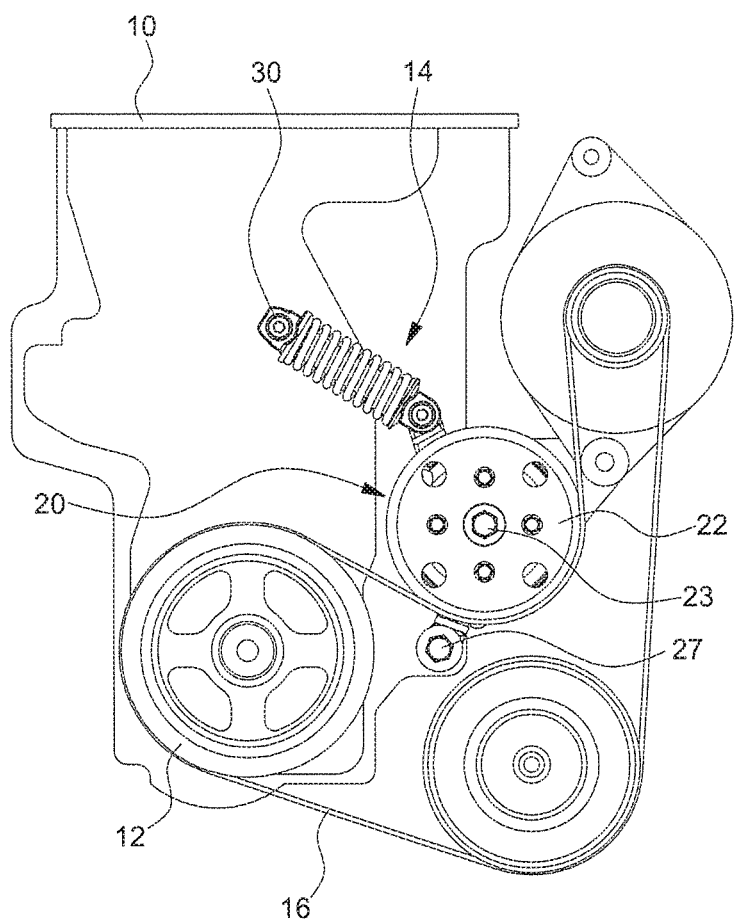
FIG. 1 is a view illustrating a layout of auto tensioner-integrated engine auxiliary devices according to an exemplary embodiment of the present disclosure.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of the present disclosure will be described in detail with reference to the accompanying drawings.

As illustrated in FIG. 1, driven pulleys of various types of engine auxiliary devices (a generator, a water pump, or an air-conditioner compressor) are connected to a crank shaft pulley 12 of an engine 10 by a power transmission belt 16 so that the engine auxiliary devices may operate by receiving power from the engine.

That is, the engine auxiliary devices such as the generator, the water pump, and the air-conditioner compressor are configured to be rotationally operated by engine power supplied through the power transmission belt 16.

In the exemplary embodiment of the present disclosure, the engine auxiliary device integrated with an auto tensioner 14, which may adjust tension of the power transmission belt 16 by using a water pump pulley 22 among driven pulleys (i.e., pulley units) of the engine auxiliary devices which are operated by receiving engine power through the power transmission belt 16, will be described.

Figure 2:
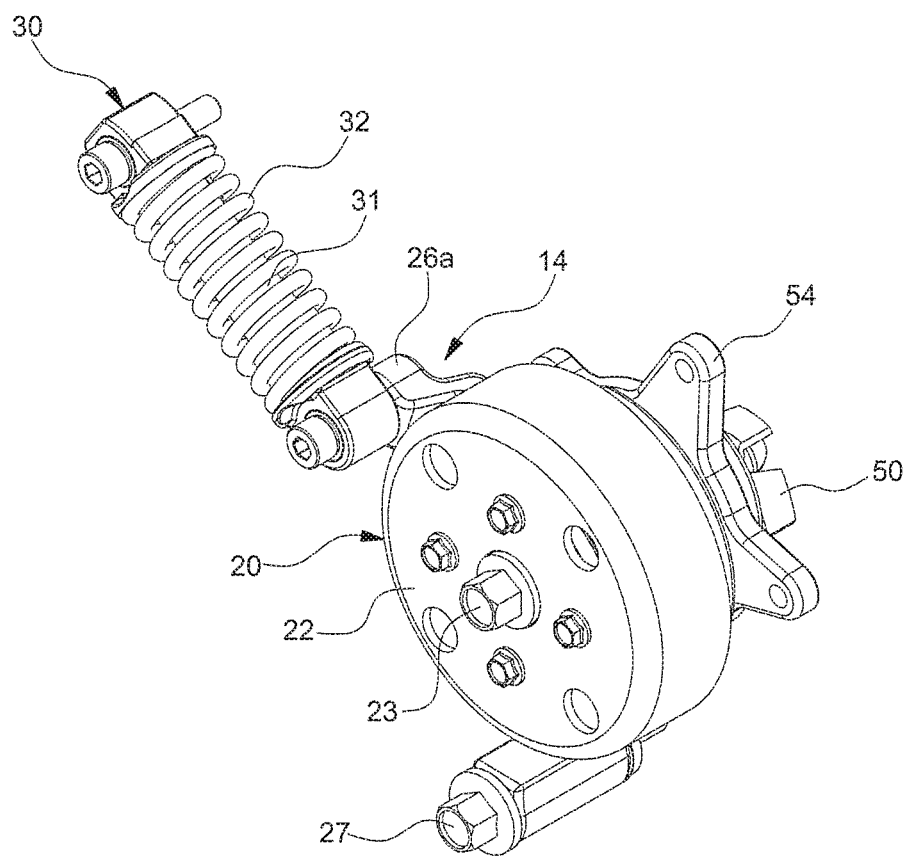
FIG. 2 is a coupled perspective view illustrating the auto tensioner-integrated engine auxiliary device according to the exemplary embodiment of the present disclosure.
Figure 3:
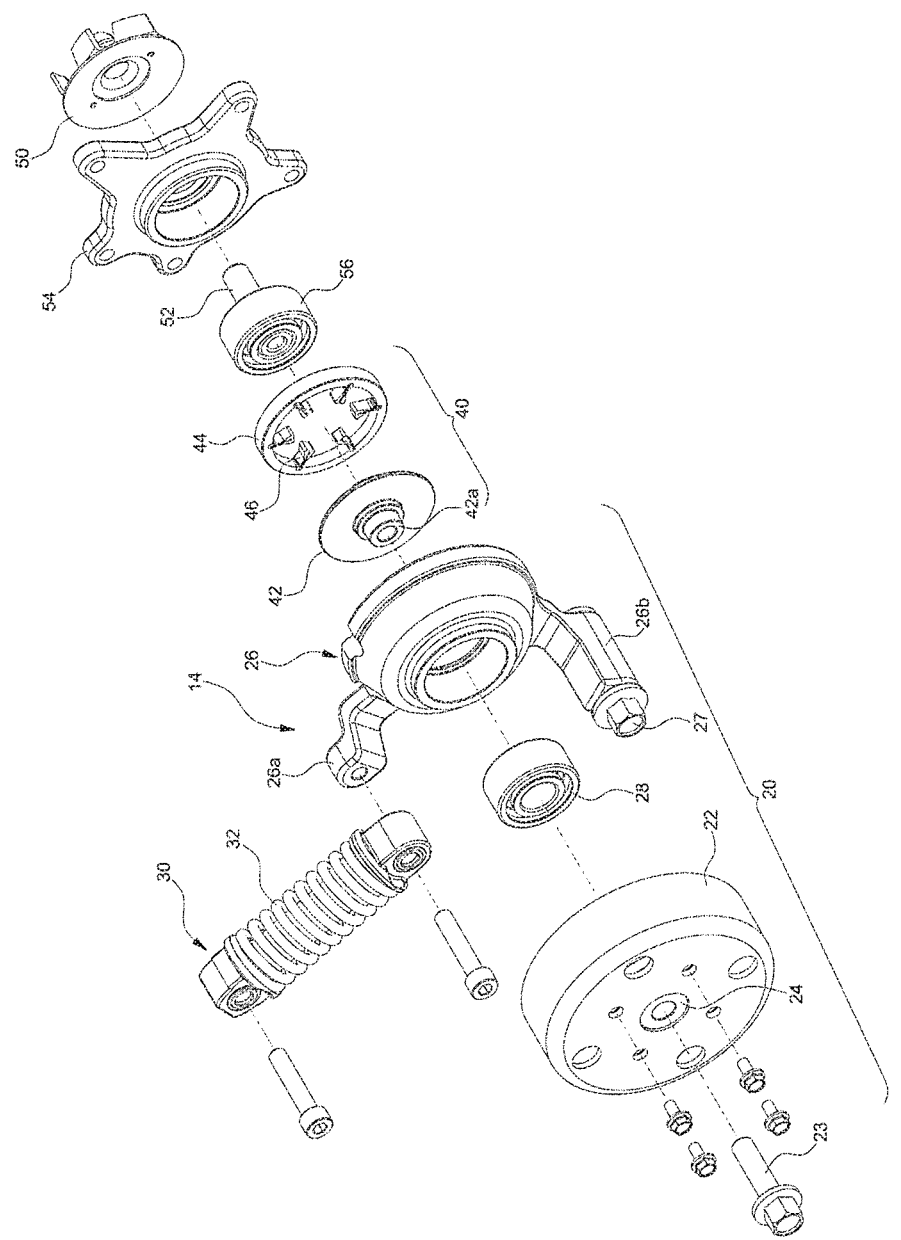
FIG. 3 is an exploded perspective view illustrating the auto tensioner-integrated engine auxiliary device according to the exemplary embodiment of the present disclosure.
Figure 4:
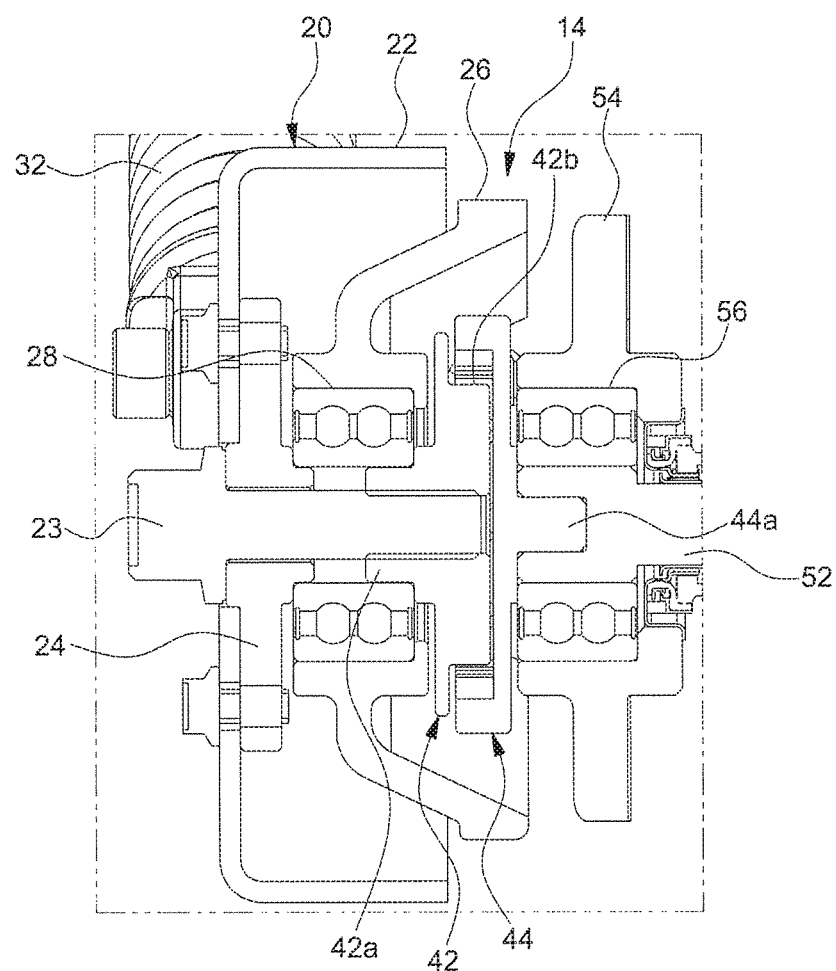
FIG. 4 is a cross-sectional view illustrating an assembled structure of the auto tensioner-integrated engine auxiliary device according to the exemplary embodiment of the present disclosure.
Figure 5:
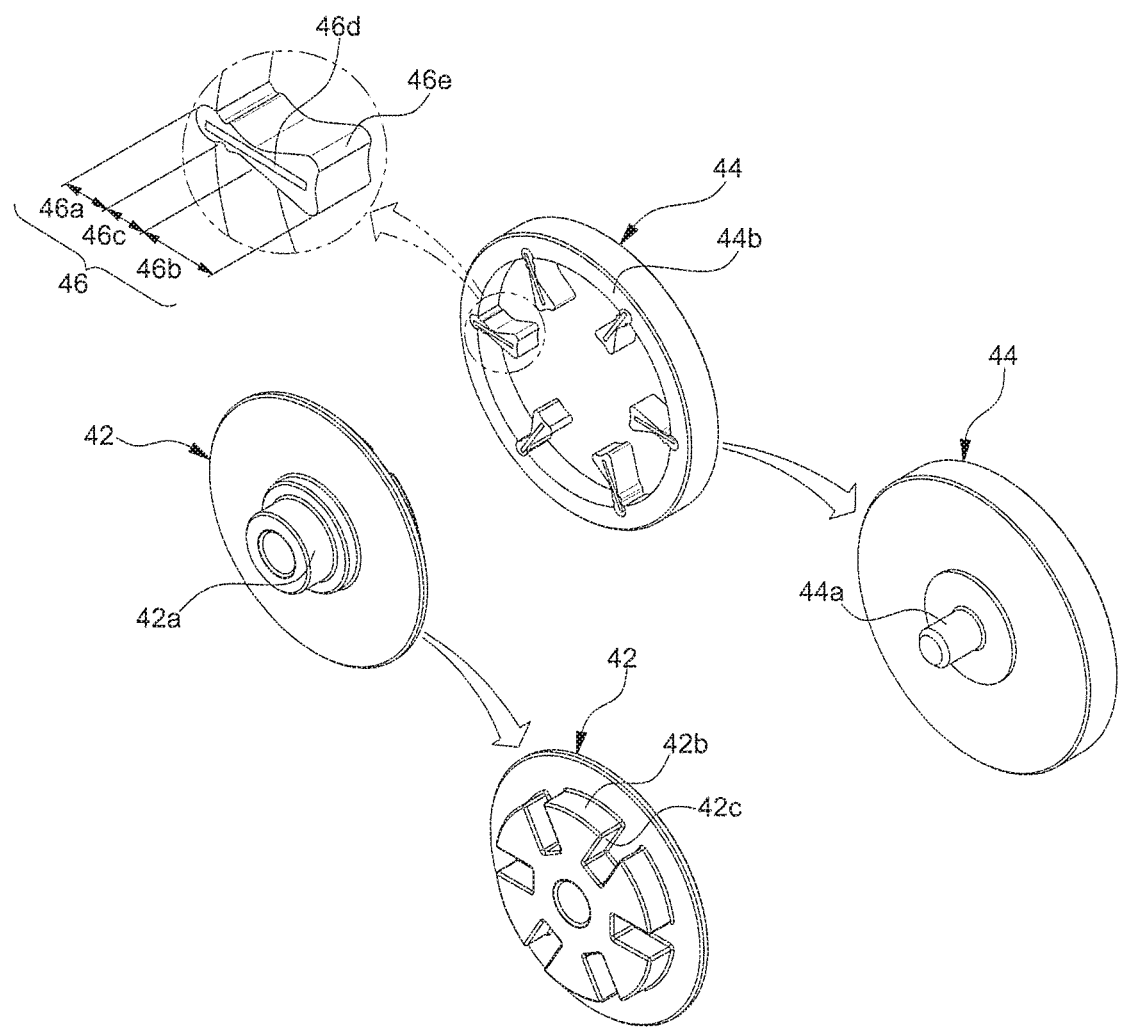
FIG. 5 is an enlarged view illustrating a configuration of a power transmission unit of the auto tensioner-integrated engine auxiliary device according to the exemplary embodiment of the present disclosure.

FIG. 1 illustrates a layout and an installed state of the auto tensioner-integrated engine auxiliary devices according to the exemplary embodiment of the present disclosure, FIGS. 2 and 3 illustrate a configuration of the auto tensioner-integrated engine auxiliary device according to the exemplary embodiment of the present disclosure, FIG. 4 illustrates an assembled structure of the auto tensioner-integrated engine auxiliary device according to the exemplary embodiment of the present disclosure, and FIG. 5 illustrates an enlarged view of a power transmission unit according to the exemplary embodiment of the present disclosure.

As illustrated in FIGS. 2 and 3, the auto tensioner-integrated engine auxiliary device according to the present disclosure includes a water pump pulley part 20, a driving member 30, a power transmission unit 40, and a water pump impeller 50.

Referring to FIG. 1, the water pump pulley part 20 is pivotable about a pivot shaft 27 by power supplied by the hydraulic driving member 30.

The driving member 30 includes a cylinder portion 31 which is extended by supplied hydraulic pressure, and an elastic member 32, which creates restoring force by being deformed, is provided on an outer circumferential surface of the cylinder portion 31. The driving member 30 provides power for pivoting the water pump pulley part 20 while being extended in an axial direction (or a longitudinal direction) by the supplied hydraulic pressure and creates elastic restoring force in accordance with deformation of the elastic member 32. The driving member 30 has a structure configured to return the water pump pulley part 20 by being restored by the elastic restoring force of the elastic member 32 when the hydraulic pressure is eliminated.

One end portion of both end portions in the longitudinal direction of the driving member 30 is rotatably mounted on the engine (specifically, a cylinder block of the engine), and another end portion thereof is rotatably coupled to a support bracket 26 of the water pump pulley part 20.

The support bracket 26 is mounted between the driving member 30 and the engine 10 and pivotable about the pivot shaft 27. An engine coupling hinge portion 26a, which protrudes from one side of an outer circumferential surface of the support bracket 26, is rotatably mounted on the engine 10 by the pivot shaft 27, and a driving member coupling hinge portion 26b, which protrudes from another side of the outer circumferential surface of the support bracket 26, is rotatably fastened to one end portion of the driving member 30.

Therefore, the water pump pulley part 20, which includes the support bracket 26 and the water pump pulley 22, is pivoted about the pivot shaft 27 along an arc by pivoting power provided from the driving member 30 when the driving member 30 extends.

The water pump pulley part 20 is provided with a rotating shaft 23 and an adapter 24 of the water pump pulley 22.

The water pump pulley 22 imparts a predetermined tension to the power transmission belt 16 while rotating by receiving engine power through the power transmission belt 16 and while a center of rotation is eccentrically moved by pivoting power provided by the driving member 30. The water pump pulley 22 is mounted in a movement trajectory of the power transmission belt 16 so as to be movable by the driving member 30, and the water pump pulley 22 has an outer circumferential surface having a predetermined width so as to be in friction contact with the power transmission belt 16.

Referring to FIG. 4, the water pump pulley 22 has the rotating shaft 23 which is provided at the center of rotation of the water pump pulley 22 and rotates and pivots simultaneously with the water pump pulley 22, and the rotating shaft 23 is integrally coupled to the center of rotation of the water pump pulley 22 through the adapter 24.

The rotating shaft 23 is rotatably coupled to an inner circumferential surface of the support bracket 26 by a first bearing 28, and as a result, the water pump pulley 22 may pivot, simultaneously with the support bracket 26, about the pivot shaft 27 in a state in which the water pump pulley 22 is stacked on the support bracket 26.

The rotating shaft 23 penetrates the support bracket 26 and is integrally coupled to a rotation center (i.e., a shaft coupling portion) of a driving plate 42 in a press-fit manner, and may rotate and pivot simultaneously with the driving plate 42.

As illustrated in FIG. 4, actually, a shaft coupling portion 42a of the driving plate 42 and the adapter 24 of the water pump pulley 22 are fixedly coupled to an inner race of the first bearing 28, and as a result, the rotating shaft 23 is rotatably coupled to the inner circumferential surface of the support bracket 26 by the first bearing 28.

In more detail, the adapter 24 and the shaft coupling portion 42a of the driving plate 42, which are coupled to the outer circumferential surface of the rotating shaft 23, are rotatably installed on the inner circumferential surface of the support bracket 26 by the first bearing 28, and as a result, the water pump pulley 22 and the driving plate 42 are supported to be rotatable simultaneously about the rotating shaft 23.

That is, the first bearing 28 is mounted on the inner circumferential surface of the support bracket 26 and rotatably supports the water pump pulley 22, the rotating shaft 23, and the driving plate 42.

As illustrated in FIGS. 3 to 5, the power transmission unit 40 including the driving plate 42 includes a driven plate 44 and a plurality of vanes 46 as well as the driving plate 42.

The power transmission unit 40 allows power to be normally transmitted to the water pump impeller 50 even though the rotation center of the water pump pulley 22 is eccentric from a center of rotation the water pump impeller 50 because of the pivot of the water pump pulley part 20.

The driven plate 44 is coupled to a rotating shaft of the water pump impeller 50, that is, an impeller shaft 52 so as to be rotatable simultaneously with the impeller shaft 52, the driving plate 42 is coupled to the rotating shaft 23 of the water pump pulley 22 so as to be rotatable simultaneously with the rotating shaft 23, and the plurality of vanes 46 for transmitting power is assembled between the driven plate 44 and the driving plate 42.

Head portions 46*a* of the vanes 46 are fixedly mounted on an inner circumferential surface of a raised portion 44*b* which is formed as an edge portion of one surface of the driven plate 44 is raised, and a shaft coupling portion 44*a*, which is coupled to the impeller shaft 52, is formed at a center of rotation of another surface of the driven plate 44.

The vanes 46 are of a pendulum type including the head portions 46*a* which are fixedly coupled to the driven plate 44, and body portions 46*b* which are assembled to be linearly movable in moving grooves 42*c* provided in the driving plate 42. The vanes 46 serve to effectively transmit rotational power of the driving plate 42 to the driven plate 44.

In more detail, the vanes 46 are assembled between the driving plate 42 and the driven plate 44 and normally transmit rotational force of the driving plate 42 to the driven plate 44 even when the water pump pulley 22 pivots. In a case in which the rotation center of the water pump pulley 22 is eccentric from the rotation center of the driven plate 44, in other words, in a case in which the water pump pulley 22 is eccentrically moved to adjust tension of the power transmission belt 16, the vanes 46 allow rotational force of the driving plate 42 to be effectively transmitted to the driven plate 44 (see FIGS. 6A and 6B).

To this end, a driving block 42*b*, which has the plurality of moving grooves 42*c* in which the body portions 46*b* of the vanes 46 may slide and linearly move, protrudes from one surface of the driving plate 42, and the body portions 46*b* of the vanes 46 are linearly movably inserted into the plurality of moving grooves 42*c*, respectively.

The plurality of moving grooves 42*c* is disposed at predetermined intervals along an outer circumferential surface of the driving block 42*b*, and each of the moving grooves 42*c* extends in a radial direction from the outer circumferential surface to a center of rotation of the driving block 42*b*.

Since the rotating shaft of the water pump pulley 22 is rotatably coupled to the center of rotation of the driving plate 42 in a press-fit manner, the driving plate 42 is moved simultaneously with the water pump pulley 22 when the water pump pulley 22 eccentrically moves. However, even when the driving plate 42 pivots, the driving plate 42 and the driven plate 44 are maintained to be connected by the vanes 46 so as to transmit power, and as a result, the rotational power of the driving plate 42 is normally transmitted to the driven plate 44 regardless of the eccentric movement of the driving plate 42, such that power is transmitted to the water pump impeller 50.

In this case, in order to allow power to be smoothly transmitted through the vanes 46, each of the vanes 46 may have a neck portion 46*c* which is connected between the head portion 46*a* and the body portion 46*b* and has a narrowed shape. Therefore, when the driving plate 42 pivots about the pivot shaft 27, the body portion 46*b* is resiliently bent relative to the head portion 46*a*, such that the connection (the connection for power transmission) between the driving plate 42 and the driven plate 44 is maintained (see FIGS. 6A and 6B).

As illustrated in FIG. 5, each of the vane has a structure in which a plate-shaped core portion 46*d*, which ensures rigidity and elasticity for power transmission, is inserted into the vane 46 in order to allow the rotational force of the driving plate 42 to be effectively transmitted to the driven plate 44 and to smoothly perform the linear movement in the moving grooves 42*c*, and an injection molded portion 46*e*, which is made of a plastic material and has a lubrication function and elasticity, is formed outside the core portion 46*d* by injection molding.

In other words, the vane 46 includes the inner core portion 46*d* for ensuring rigidity and elasticity, and the outer injection molded portion 46*e* for ensuring linear mobility, and the injection molded portion 46*e* is divided into the head portion 46*a*, the body portion 46*b*, and the neck portion 46*c*.

The body portion 46*b* extends from the head portion 46*a* toward the center of the driven plate 44 with the neck portion 46*c* interposed between the head portion 46*a* and the body portion 46*b*, and in this case, the body portion 46*b* is formed by injection molding such that a thickness of the body portion 46*b* is increased toward the center of the driven plate 44 (in a direction toward the center).

The injection molded portion 46*e* serves to provide a lubrication function by using a material characteristic, without using lubricating oil, so that the body portion 46*b* of the vane 46 smoothly moves in the moving groove 42*c* of the driving plate 42.

The impeller shaft 52, which is fixedly coupled to the center of rotation of the driven plate 44, is rotatably supported by a second bearing 56 mounted on an inner circumferential surface of a water pump bracket 54, and the water pump bracket 54 is fixedly mounted on the engine 10 (specifically, the cylinder block of the engine).

The auto tensioner-integrated engine auxiliary device according to the present disclosure which is configured as described above, may perform a typical function of the water pump (a function of pumping a coolant) so as to circulate the coolant to be supplied to the engine, and may simultaneously adjust tension of the power transmission belt as necessary.

Here, a power transmission process in which engine power, which is supplied to the water pump pulley 22 by the operation of the power transmission belt 16 connected to the crank shaft pulley 12 that is rotated by the operation of the engine, is transmitted to the water pump impeller 50 will be described below with reference to FIGS. 6A to 7.

Figure 7:
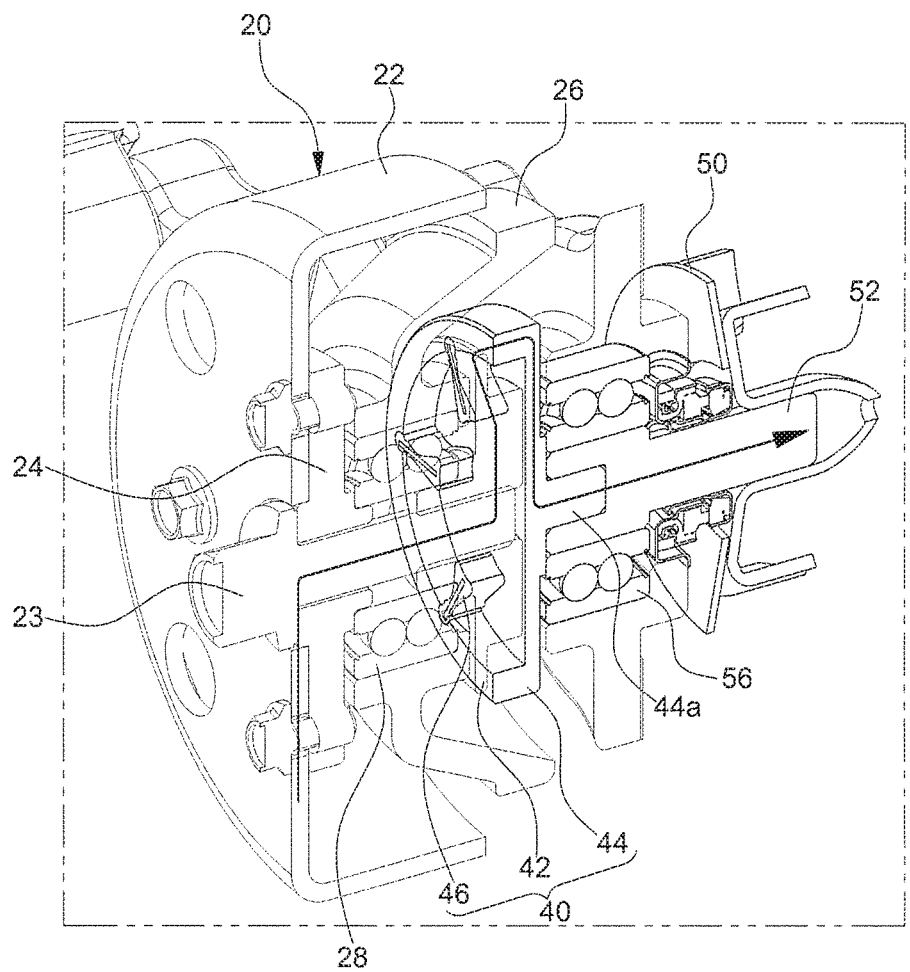
FIG. 7 is a view illustrating a power transmission sequence in accordance with an operation of a power transmission belt of the auto tensioner-integrated engine auxiliary device according to the exemplary embodiment of the present disclosure.

Referring to the arrow indicated in FIG. 7, the rotational force, which is transmitted to the water pump pulley 22 by the operation of the power transmission belt 16, is transmitted to the driving plate 42 through the rotating shaft 23 of the water pump pulley 22, and the rotational force of the driving plate 42 is transmitted to the driven plate 44 through the vanes 46, such that the rotational force caused by the operation of the power transmission belt 16 is transmitted to the water pump impeller 50 integrally coupled to the driven plate 44.

Figure 6A:
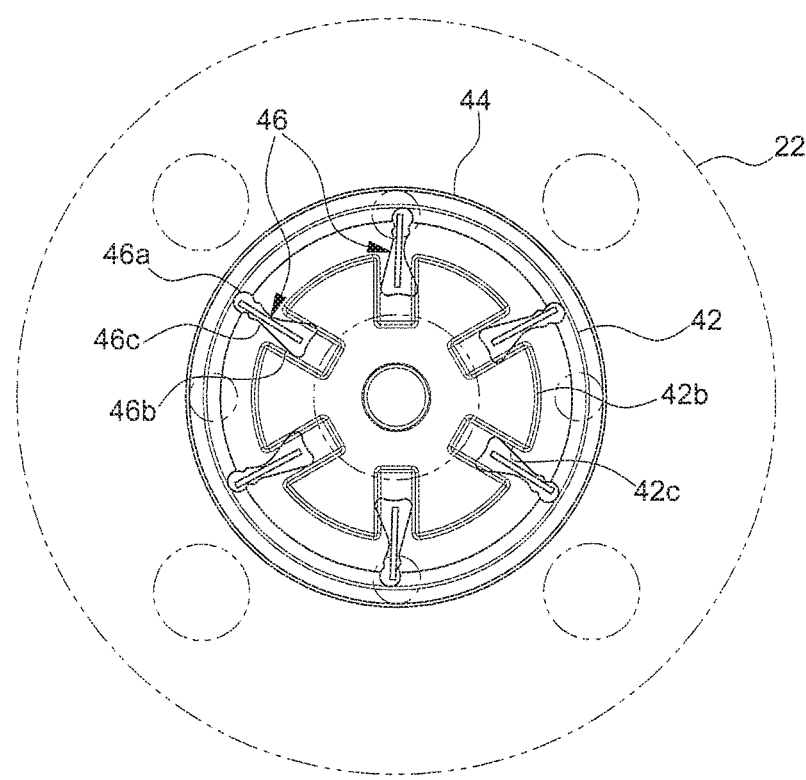
FIG. 6A is a view illustrating an assembled shape of vanes installed between a driving plate and a driven plate of the auto tensioner-integrated engine auxiliary device according to the exemplary embodiment of the present disclosure.
Figure 6B:
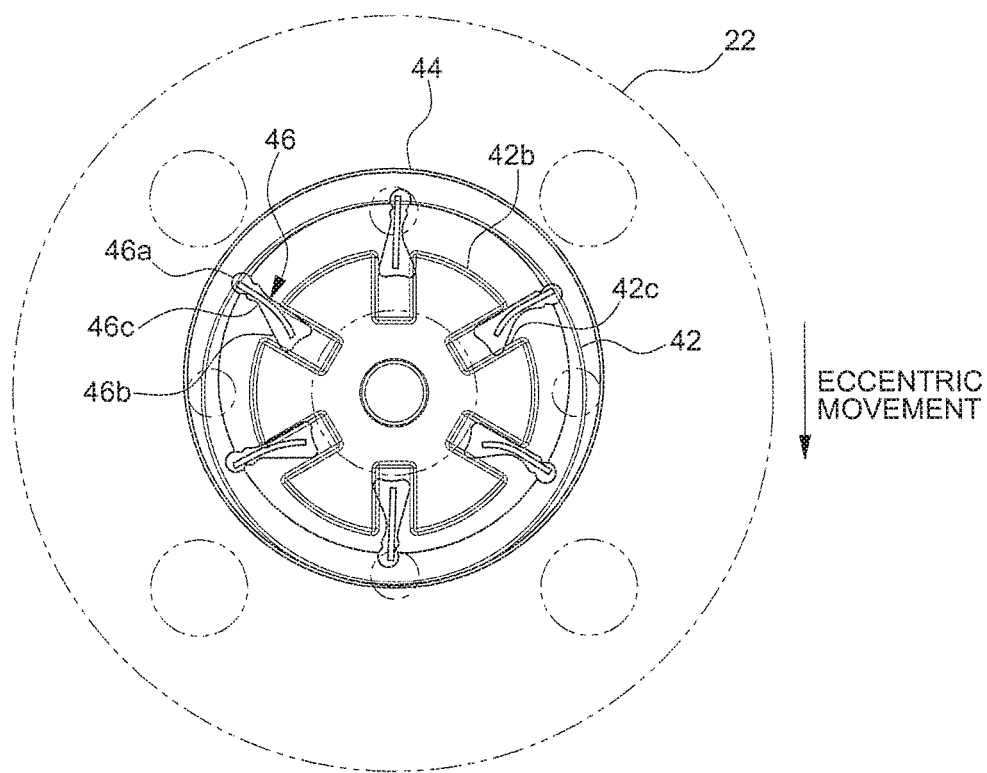
FIG. 6B is an exemplified view illustrating an operating state of the vanes installed between the driving plate and the driven plate of the auto tensioner-integrated engine auxiliary device according to the exemplary embodiment of the present disclosure.

In this case, when the driving plate 42, together with the water pump pulley 22, pivots about the pivot shaft 27, the vanes 46 are resiliently deformed by being moved in the moving grooves 42*c* so that the driving plate 42 is pivotable, and the vanes 46 simultaneously maintains the connection state for power transmission between the driving plate 42 and the driven plate 44, as illustrated in FIGS. 6A and 6B, and as a result, the rotational force of the driving plate 42 is effectively transmitted to the driven plate 44, and the water pump impeller 50 normally rotates, such that the engine coolant is normally circulated by the rotation of the water pump impeller 50.

As described above, according to the auto tensioner-integrated engine auxiliary device according to the present disclosure, since the power transmission unit 40 may transmit the rotational force of the driving plate 42 to the driven plate 44 through the vanes 46 assembled between the driving plate 42 and the driven plate 44 regardless of the pivot of the driving plate 42 that moves integrally with the water pump pulley 22, it is possible to adjust tension of the power transmission belt 16 by pivoting the water pump pulley 22 and to simultaneously perform the function of the water pump which circulates the engine coolant by rotating the water pump impeller 50.

Since the function of adjusting tension of the power transmission belt 16 is performed by using the water pump pulley 22, it is possible to omit a tensioner pulley that was used to adjust tension of the existing power transmission belt, reduce a size of a package, increase a mounting space, reduce a length of the power transmission belt, reduce costs and a weight, and improve fuel economy. In addition, it is possible to implement a compact and simple layout of the power transmission belt to which the engine auxiliary device and the auto tensioner are applied.

Hereinafter, the auto tensioner according to the exemplary embodiment of the present disclosure will be described, and because the description associated with the auto tensioner 14 according to the present disclosure is included in the aforementioned description associated with the auto tensioner-integrated engine auxiliary device (water pump), some of descriptions associated with the auto tensioner 14 will be omitted.

The auto tensioner 14 according to the exemplary embodiment of the present disclosure is configured to adjust tension of the power transmission belt 16 by utilizing the driven pulley of the water pump (i.e., the water pump pulley) of the engine auxiliary device which is rotated by engine power transmitted through the power transmission belt 16, and the auto tensioner 14 is mounted on the rotating shaft 23 of the water pump pulley 22, which is a pulley unit of the water pump, and pivoting about the pivot shaft 27.

The rotating shaft 23 is coupled to the center of rotation of the water pump pulley 22 so as to be rotatable simultaneously with the water pump pulley 22, and rotates together with the water pump pulley 22 when the water pump pulley 22 rotates by power transmitted through the power transmission belt 16.

The auto tensioner 14 includes the support bracket 26 which has one side rotatably fastened to the pivot shaft 27 and another side fastened to the driving member 30 and may pivot about the pivot shaft 27 in accordance with the operation of the driving member 30, and the auto tensioner 14 is provided with the power transmission unit 40 so that power of the rotating shaft 23 may be transmitted to the water pump impeller 50 which is an output unit of the water pump.

As illustrated in FIG. 4, the support bracket 26 is mounted on the rotating shaft 23 by the first bearing 28 which may rotate relative to the rotating shaft 23, and the support bracket 26, which is mounted on the rotating shaft 23 as described above, is supported to be pivotable about the pivot shaft 27 by the power transmission unit 40 having a structure including the vanes 46.

The power transmission unit 40 includes the driving plate 42 which is coupled to the rotating shaft 23 and receives power, the driven plate 44 which rotates by receiving rotational force of the driving plate 42, and the plurality of vanes 46 which transmits the rotational force of the driving plate 42 to the driven plate 44.

Here, the vane 46 may be formed to have the aforementioned structure, and the water pump impeller 50, which is the output unit of the water pump, rotates by receiving rotational power of the rotating shaft 23 by the power transmission unit 40.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An auto tensioner which is mounted on a rotating shaft of an engine auxiliary device rotating about the rotating shaft by a power transmitted through a power transmission belt, the auto tensioner pivoting about a pivot shaft,
   wherein the auto tensioner includes:
   a driving plate which is coupled to the rotating shaft and receives the power; and
   a driven plate which rotates by receiving a rotational force of the driving plate,
   wherein a plurality of vanes, which transmit the rotational force of the driving plate to the driven plate, are disposed on the driven plate.

2. The auto tensioner of claim 1, wherein the auto tensioner has one side rotatably fastened to the pivot shaft and another side fastened to a driving member, and pivots about the pivot shaft in accordance with an operation of the driving member.

3. The auto tensioner of claim 2, wherein the driving member includes:
   a cylinder portion that is operated by hydraulic pressure; and
   an elastic member, which provides restoring force when the hydraulic pressure is eliminated, is disposed on an outer circumferential surface of the cylinder portion.

4. The auto tensioner of claim 1, wherein each of the vanes includes:
   a head portion which is fixed to an edge portion of the driven plate; and
   a body portion which extends from the head portion toward a center of the driven plate, and
   wherein a driving block, which has moving grooves in which the body portion is accommodated, is formed on the driving plate.

5. The auto tensioner of claim 1, wherein a core portion is inserted into the vanes, and
   wherein a thickness of the body portion is increased in a direction toward a center of the driven plate.

6. An auto tensioner-integrated engine auxiliary device comprising:
   a pulley unit which rotates by a power transmitted through a power transmission belt;
   a rotating shaft which is coupled to a center of the pulley unit and rotates simultaneously with the pulley unit;
   an output unit which rotates by receiving the power of the rotating shaft;
   an auto tensioner which operates such that the rotating shaft pivots about a pivot shaft;
   a driving plate which is coupled to the rotating shaft and receives the power; and
   a driven plate which rotates by receiving a rotational force of the driving plate, wherein a plurality of vanes, which transmit the rotational force of the driving plate to the driven plate even when the rotating shaft pivots, are disposed on the driven plate.

7. The auto tensioner-integrated engine auxiliary device of claim 6, wherein the auto tensioner is mounted on the rotating shaft by a bearing that is rotatable relative to the rotating shaft.

8. The auto tensioner-integrated engine auxiliary device of claim 6, wherein the auto tensioner has one side rotatably fastened to the pivot shaft and another side fastened to a driving member, and pivots about the pivot shaft in accordance with an operation of the driving member.

9. The auto tensioner-integrated engine auxiliary device of claim 8, wherein the driving member includes:
   a cylinder portion that is operated by hydraulic pressure; and
   an elastic member, which provides restoring force when the hydraulic pressure is eliminated, is disposed on an outer circumferential surface of the cylinder portion.

10. The auto tensioner-integrated engine auxiliary device of claim 6, wherein each of the vanes includes:
    a head portion which is fixed to an edge portion of the driven plate; and
    a body portion which extends from the head portion toward a center of the driven plate, and
    wherein a driving block, which has moving grooves in which the body portion is accommodated, is disposed on the driving plate.

11. The auto tensioner-integrated engine auxiliary device of claim 6, wherein a core portion is inserted into the vanes, and
    wherein a thickness of the body portion is increased in a direction toward a center of the driven plate.

12. The auto tensioner-integrated engine auxiliary device of claim 6, wherein the pulley unit is a water pump pulley, and the output unit is a water pump impeller.

13. An auto tensioner-integrated engine auxiliary device comprising:
    a water pump pulley which adjusts tension of a power transmission belt by pivoting about a pivot shaft and simultaneously rotates about a rotating shaft by a power transmitted through the power transmission belt; and
    a power transmission unit which transmits rotational power of the water pump pulley, which rotates about the rotating shaft, to a water pump impeller.

14. The auto tensioner-integrated engine auxiliary device of claim 13, wherein the water pump pulley is coupled to an inner circumferential surface of a support bracket so as to be rotatable simultaneously with the rotating shaft, and
    wherein the support bracket has: a driving member coupling hinge portion coupled to a driving member; and an engine coupling hinge portion mounted on an engine to be rotatable about the pivot shaft.

15. The auto tensioner-integrated engine auxiliary device of claim 13, wherein the power transmission unit includes:
    a driving plate which is coupled to the water pump pulley to be rotatable and pivotable integrally with the water pump pulley;
    a driven plate which is coupled to the water pump impeller so as to be rotatable simultaneously with the water pump impeller and rotates by receiving a rotational force of the driving plate; and
    a plurality of vanes which are assembled between the driving plate and the driven plate and transmit the rotational force of the driving plate to the driven plate even when the water pump pulley pivots.

16. The auto tensioner-integrated engine auxiliary device of claim 15, wherein the vanes include:
    a head portion which is fixed to the driven plate; and
    a body portion which is assembled to be linearly movable in a moving groove provided in the driving plate.

17. The auto tensioner-integrated engine auxiliary device of claim 16, wherein the vanes have a neck portion which is connected between the head portion and the body portion and has a narrowed shape, such that when the driving plate pivots about the pivot shaft, the body portion is resiliently bendable relative to the head portion.

18. The auto tensioner-integrated engine auxiliary device of claim 16, wherein a driving block, which has a plurality of moving grooves, is provided on the driving plate, and the moving grooves extend in a radial direction from an outer circumferential surface of the driving block.

* * * * *